US011163351B2

(12) United States Patent
Ting et al.

(10) Patent No.: US 11,163,351 B2
(45) Date of Patent: *Nov. 2, 2021

(54) POWER ESTIMATION

(71) Applicant: TAIWAN SEMICONDUCTOR MANUFACTURING CO., LTD., Hsinchu (TW)

(72) Inventors: Kai-Yuan Ting, San Jose, CA (US); Shereef Shehata, San Ramon, CA (US); Tze-Chiang Huang, Saratoga, CA (US); Sandeep Kumar Goel, Dublin, CA (US); Mei Wong, Saratoga, CA (US); Yun-Han Lee, Hsinchu County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 170 days.

This patent is subject to a terminal disclaimer.

(21) Appl. No.: 16/505,347

(22) Filed: Jul. 8, 2019

(65) Prior Publication Data

US 2019/0332161 A1    Oct. 31, 2019

Related U.S. Application Data

(63) Continuation of application No. 15/169,635, filed on May 31, 2016, now Pat. No. 10,345,883.

(51) Int. Cl.
*G06F 1/28* (2006.01)
*G06F 1/3228* (2019.01)

(52) U.S. Cl.
CPC .............. *G06F 1/3228* (2013.01); *G06F 1/28* (2013.01)

(58) Field of Classification Search
CPC .................................. G06F 1/3228; G06F 1/28
See application file for complete search history.

(56) References Cited

U.S. PATENT DOCUMENTS

| 5,265,233 A | 11/1993 | Failong et al. |
| 8,957,729 B2 | 2/2015 | Bai et al. |
| 9,459,984 B2 | 10/2016 | Bratonov et al. |
| 9,547,027 B2 | 1/2017 | Varma et al. |

(Continued)

FOREIGN PATENT DOCUMENTS

| CN | 101604200 A | 12/2009 |
| CN | 104204825 A | 12/2014 |

*Primary Examiner* — Aurel Prifti
(74) *Attorney, Agent, or Firm* — Maschoff Brennan (57) ABSTRACT

A device for power estimation is disclosed. The device includes a transformer circuit coupled with a processing circuit and a transaction interface. The transformer circuit is configured to count performance activities executed in the processing circuit and to compare count values of the performance activities with a predetermined value to determine a power state of the processing circuit. The transaction interface is configured to receive a request from the processing circuit and record a first timestamp, and further configured to receive a response from a memory model and record a second timestamp, the transaction interface being further configured to record a time difference between the first timestamp and the second timestamp as a time difference. The transformer circuit is further configured to determine the power state of the processing circuit based on both of the count values and the time difference.

20 Claims, 7 Drawing Sheets

(56) References Cited

U.S. PATENT DOCUMENTS

| | | | |
|---|---|---|---|
| 2004/0107374 A1* | 6/2004 | Cooper | G06F 1/3228 |
| | | | 713/320 |
| 2005/0121106 A1* | 6/2005 | Rastatter | B27C 5/08 |
| | | | 144/209.1 |
| 2006/0248410 A1 | 11/2006 | Circello et al. | |
| 2007/0011421 A1 | 1/2007 | Keller et al. | |
| 2008/0222632 A1 | 9/2008 | Ueno et al. | |
| 2009/0083735 A1 | 3/2009 | Kimura et al. | |
| 2009/0222654 A1 | 9/2009 | Hum et al. | |
| 2009/0292935 A1 | 11/2009 | Hallnor et al. | |
| 2010/0058078 A1* | 3/2010 | Branover | G06F 1/3246 |
| | | | 713/300 |
| 2010/0095137 A1* | 4/2010 | Bieswanger | G06F 1/3296 |
| | | | 713/300 |
| 2010/0122031 A1 | 5/2010 | Stumpen et al. | |
| 2010/0235836 A1 | 9/2010 | Bratanov | |
| 2010/0268816 A1 | 10/2010 | Tarui et al. | |
| 2010/0268974 A1* | 10/2010 | Floyd | G06F 1/3203 |
| | | | 713/340 |
| 2010/0268975 A1* | 10/2010 | Bose | G06F 11/3006 |
| | | | 713/340 |
| 2010/0274890 A1 | 10/2010 | Patel et al. | |
| 2011/0093724 A1* | 4/2011 | Park | G06F 1/324 |
| | | | 713/300 |
| 2011/0093733 A1* | 4/2011 | Kruglick | G06F 1/3243 |
| | | | 713/340 |
| 2011/0178652 A1* | 7/2011 | Carter | G06F 1/329 |
| | | | 700/296 |
| 2011/0213950 A1* | 9/2011 | Mathieson | G06F 9/5094 |
| | | | 712/30 |
| 2011/0252255 A1* | 10/2011 | Safford | G06F 1/3234 |
| | | | 713/320 |
| 2011/0301889 A1* | 12/2011 | Naffziger | G06F 1/3203 |
| | | | 702/62 |
| 2012/0017188 A1* | 1/2012 | Lepak | G06F 30/33 |
| | | | 716/109 |
| 2012/0159221 A1* | 6/2012 | Guddeti | G06F 1/3287 |
| | | | 713/323 |
| 2012/0254595 A1* | 10/2012 | Wu | G06F 1/3206 |
| | | | 712/208 |
| 2012/0260117 A1* | 10/2012 | Acar | G06F 1/3243 |
| | | | 713/340 |
| 2014/0195828 A1 | 7/2014 | Varma et al. | |
| 2014/0244459 A1* | 8/2014 | Webb | G06Q 30/04 |
| | | | 705/34 |
| 2014/0281625 A1* | 9/2014 | Younger | G06F 1/3206 |
| | | | 713/323 |
| 2014/0281629 A1 | 9/2014 | Bose et al. | |
| 2014/0281653 A1 | 9/2014 | Gilda et al. | |
| 2015/0033045 A1* | 1/2015 | Raghuvanshi | G06F 1/3243 |
| | | | 713/320 |
| 2015/0121106 A1 | 4/2015 | Eckert et al. | |
| 2015/0177799 A1* | 6/2015 | Gendler | G06F 1/26 |
| | | | 713/300 |
| 2015/0212947 A1* | 7/2015 | Henry | G06F 1/3287 |
| | | | 713/323 |
| 2015/0234442 A1* | 8/2015 | Emami | G06F 1/3206 |
| | | | 713/323 |
| 2015/0253837 A1* | 9/2015 | Sukonik | G06F 1/3287 |
| | | | 713/320 |
| 2016/0285385 A1 | 9/2016 | Venerus et al. | |
| 2016/0352761 A1* | 12/2016 | McGrew | H04L 63/1408 |
| 2016/0378168 A1* | 12/2016 | Branover | G06F 1/3243 |
| | | | 713/323 |
| 2017/0048671 A1* | 2/2017 | Marri Sridhar | H04W 4/023 |
| 2017/0091063 A1* | 3/2017 | Schulz | G06F 11/348 |

\* cited by examiner

POWER ESTIMATION

PRIORITY CLAIM AND CROSS-REFERENCE

This application is a continuation of U.S. application Ser. No. 15/169,635 filed May 31, 2016, Now U.S. Pat. No. 10,345,883, issued on Jul. 9, 2019, which is herein incorporated by reference.

BACKGROUND

Processors, including, for example, Central Processing Units (CPU), Graphic Processing Units (GPU) or System-on-Chip integrated circuits, are developed to have more and more functions and features. These processors operated with high performance also cause heavy loading of power consumption.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

In the following description, specific details are presented to provide a thorough understanding of the embodiments of the present disclosure. Persons of ordinary skill in the art will recognize, however, that the present disclosure can be practiced without one or more of the specific details, or in combination with other components. Well-known implementations or operations are not shown or described in detail to avoid obscuring aspects of various embodiments of the present disclosure.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. As used herein, the term "and/or" includes any and all combinations of one or more of the associated listed items.

As used herein, the terms "comprising," "including," "having," "containing," "involving," and the like are to be understood to be open-ended, i.e., to mean including but not limited to.

Reference throughout the specification to "one embodiment" or "an embodiment" means that a particular feature, structure, implementation, or characteristic described in connection with the embodiment is included in at least one embodiment of the present disclosure. Thus, uses of the phrases "in one embodiment" or "in an embodiment" in various places throughout the specification are not necessarily all referring to the same embodiment. Furthermore, the particular features, structures, implementation, or characteristics may be combined in any suitable manner in one or more embodiments.

Figure 1:
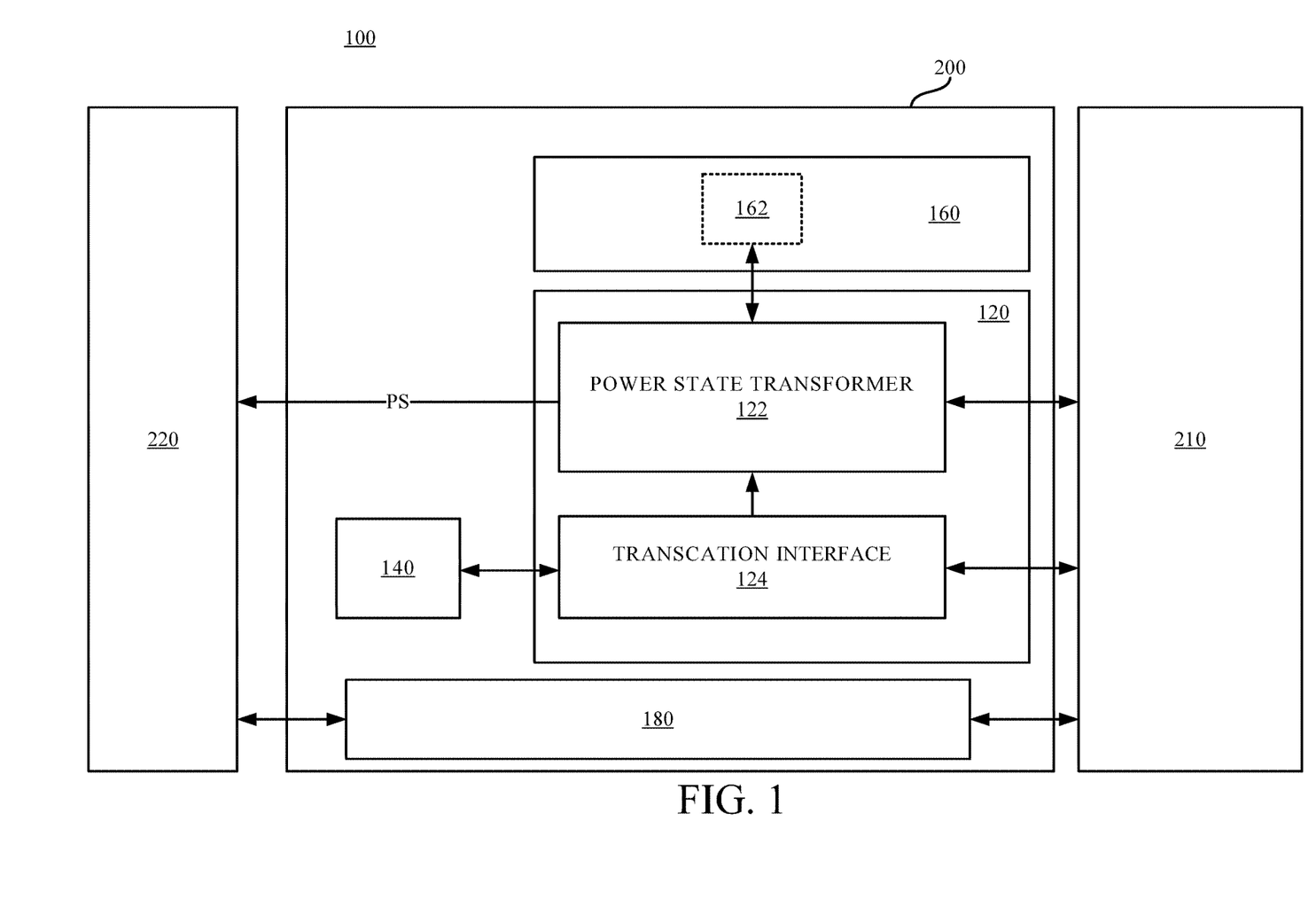
FIG. 1 is a schematic diagram illustrating a system according to some embodiments of the present disclosure.

FIG. 1 is a schematic diagram illustrating a system 100 according to some embodiments of the present disclosure. In some embodiments as illustrated in FIG. 1, the system 100 includes a graphic processing unit (GPU) model 210, a host central processing unit (CPU) 220, and a device 200. The device 200 is coupled between the GPU model 210 and the host CPU 220. In some embodiments, the system 100 is a component configured to profile GPU power consumption.

In some embodiments, the GPU model 210 is a model for simulating functions and features of a physical GPU. In some embodiments, the GPU model 210 is a software model and/or a firmware model provided by a GPU vendor, which includes, for example, Nvidia, ATI, Intel, Imagination Technologies, etc. In some embodiments, the GPU model 210 is provided to demonstrate, simulate and/or verify functions and/or features of a hardware-based GPU circuit.

In some embodiments, the host CPU 220 is configured to assign some graphic processing tasks to the GPU model 210, and obtain parameters of the GPU model 210 when the GPU model 210 processes the graphic processing tasks. In further embodiments, the graphic processing tasks include playing a video, drawing a 2D screen, drawing a 3D object, etc. In some embodiments, aforesaid parameters include power consumption information of the GPU model 210, including, for example, the information about how much power are consumed by the GPU model 210 while performing the graphic processing tasks.

As illustrated in FIG. 1, the device 200 is coupled between the GPU model 210 and the host CPU 220. In some embodiments, the device 200 is an interconnecting interface between the GPU model 210 and the host CPU 220. The device 200 provides a power state PS of the GPU model 210 to the host CPU 220, such that the host CPU 220 is able to evaluate the power consumption of the GPU model 210.

In some embodiments, the device 200 includes a power estimation adapter 120, a memory model 140, a storage unit 160 and a bus interface 180. The host CPU 220 is configured to send commands of performing the graphic processing tasks through the bus interface 180 to the GPU model 210.

The GPU model 210 returns results of the graphic processing tasks through the bus interface 180 to the GPU model 210 or outputs the results to a display (not shown in FIG. 1). While processing the graphic processing tasks, the host CPU 220 consumes some power based on loadings, configurations and/or performance of the host CPU 220. In some embodiments, the power estimation adapter 120 is configured to determine the power state PS of the GPU model 210 while the GPU model 210 is processing the graphic processing tasks.

The power estimation adapter 120 in some embodiments includes a power state transformer 122 and a transaction interface 124. The power state transformer 122 is configured to determine a power state PS of the GPU model 210. In some embodiments, the power state transformer 122 provides the power state PS of the GPU model 210 to the host CPU 220. Accordingly, the host CPU 220 is able to analyze an estimated power consumption reading according to the power state PS of the GPU model 210. In some embodiments, the transaction interface 124 is utilized to transmit access commands, data and/or transmission signals, between the memory model 140 and the GPU model 210. In some embodiments, the memory model 140 is utilized to simulate and operated as a hardware-based memory. The memory model 140 is able to be accessed by the GPU model 210 through the transaction interface 124.

In some embodiments, the storage unit 160 in FIG. 1 is configured for storing a power state lookup table 162, which is utilized by the power state transformer 122. In some embodiments, the power state lookup table 162 includes candidate power states corresponding to the GPU model 210, to be selected and utilized. In some embodiments, the candidate power states corresponding to the GPU model 210 include an active state, an idle state, a 2D processing state, a 3D processing state, a control state, a host state and the like.

In some embodiments, the power state lookup table 162 is implemented with data structures. In various embodiments, the power state lookup table 162 stores technology parameters and performance parameters. In some embodiments, the technology parameters include device parameters and variation corner parameters of different candidate power states. In some embodiments, the device parameters are utilized for implementation of a hardware-based GPU circuit (not shown), and the variation corner parameters are utilized for testing the reliability of the hardware-based GPU circuit. In some embodiments, the performance parameters include operating frequency, speed, power, maximum transition time, RC corner and/or timing paths of different candidate power states.

The aforementioned implementations of the power state lookup table 162 are given for illustrative purposes. Various implementations of the power state lookup table 162 are within the contemplated scope of the present disclosure.

Figure 2:
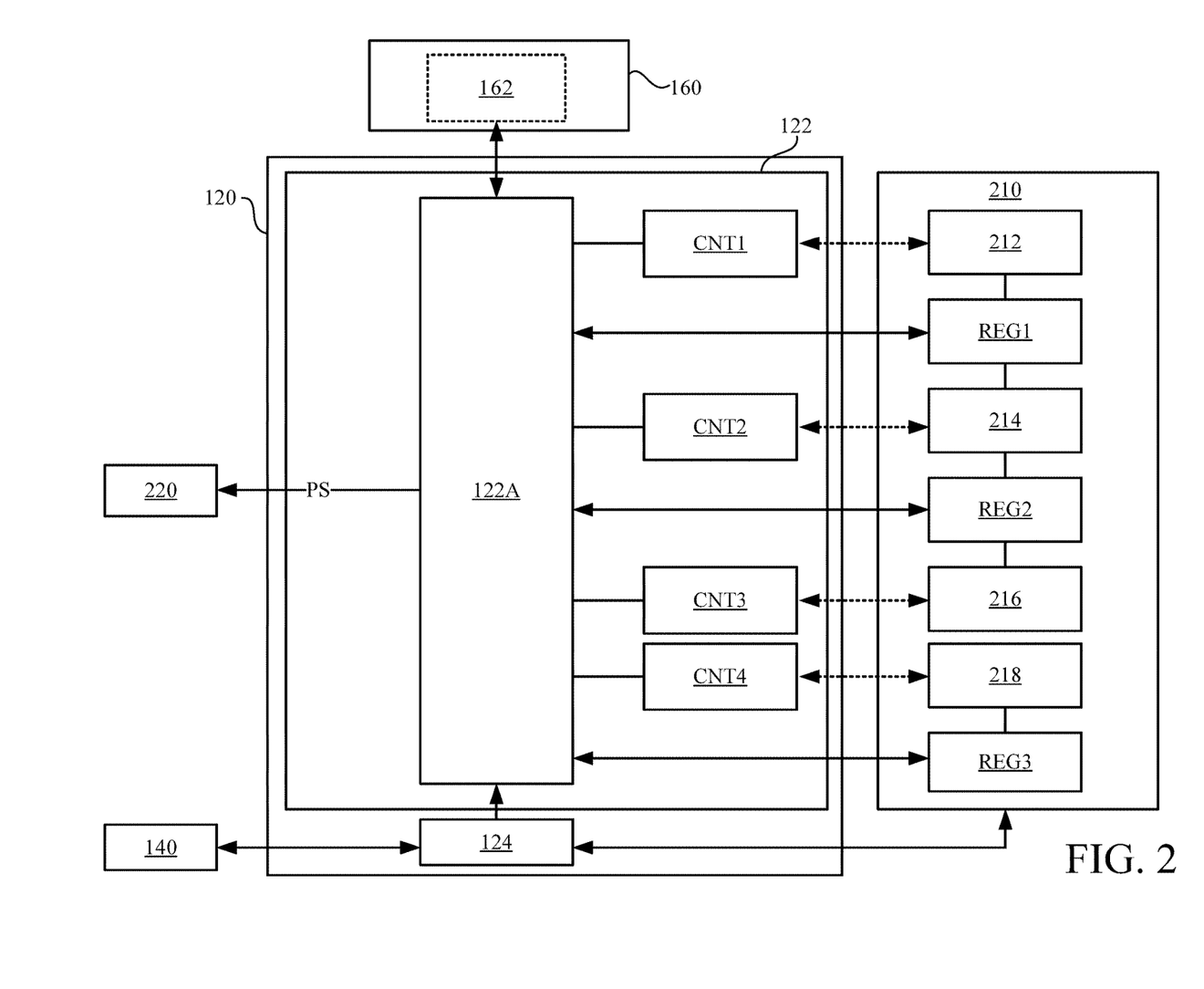
FIG. 2 is a schematic diagram illustrating further details of the power estimation adapter and the GPU model in FIG. 1 according to some embodiments of the present disclosure.

Reference is also made to FIG. 2, which is a schematic diagram illustrating further details of the power estimation adapter 120 and the GPU model 210 in FIG. 1, according to some embodiments of the present disclosure. With respect to the embodiments of FIG. 1, like elements in FIG. 2 are designated with the same reference numbers for ease of understanding.

As illustrated in FIG. 2, in some embodiments, the GPU model 210 includes processing components 212, 214, 216 and 218. The processing components 212, 214, 216 and 218 are configured to execute performance activities, including, for example, the graphic processing tasks assigned to the GPU model 210. In some embodiments, the processing components 212, 214, 216 and 218 include a shader, a texture processor, a rasterization processor, a pixel processor, a system cache and/or a texture cache of the GPU model 210. For illustration of FIG. 2, the processing component 212 is a shader, the processing component 214 is a texture processor, the processing component 216 is a rasterization processor, and the processing component 218 is a pixel processor of the GPU model 210.

In some embodiments, the GPU model 210 further includes registers REG1-REG3. The registers REG1-REG3 are configured to store and/or buffer data of the processing components 212, 214, 216 and 218.

As illustrated in FIG. 2, the data stored in the register REG1 include data outputted from the processing component 212, and include data to be inputted to the processing component 214. As illustrated in FIG. 2, the data stored in the register REG2 include data outputted from the processing component 214, and include data to be inputted to the processing component 216. As illustrated in FIG. 2, the data stored in the register REG3 include data outputted from the processing component 218. The aforementioned configurations and operations of the registers REG1-REG3 and the processing components 212, 214, 216 and 218 are given for illustrative purposes. Various configurations and operations of the registers REG1-REG3 and the processing components 212, 214, 216 and 218 are within the contemplated scope of the present disclosure.

The number of the registers and the number of the processing components in the GPU model 210 in FIG. 2 are given for illustrative purposes. Various numbers of the registers and various numbers of the processing components are able to be implemented in the GPU model 210, and are within the contemplated scope of the present disclosure.

In some embodiments, the power state transformer 122, as illustrated in FIG. 2, includes four counters CNT1-CNT4 and a power state selector 122A. The power state selector 122A is coupled to the counters CNT1-CNT4. Each of the counters CNT1-CNT4 is configured to calculate a count value corresponding to one of the processing components 212, 214, 216 and 218. In some embodiments, the counters CNT1-CNT4 is configured to calculate the count values according to the number of performance activities which are executed by the processing components 212, 214, 216 and 218 respectively in a testing period. For example, the counter CNT1 is configured to count the count value about how many times the processing component 212 is activated to calculate a shape of a graphic object or to calculate vertex coordinates of the graphic object in the testing period, which is, for example, about 5 milliseconds. For example, the counter CNT2 is configured to count the count value about how many times the processing component 214 is activated to calculate a gray level or to calculate textures of pixels of the graphic object in the testing period. With such arrangement, the counters CNT1-CNT4 are able to count total amounts of the performance activities executed by the processing components 212, 214, 216 and 218 in the GPU model 210 during the testing period.

In some other embodiments, the counters CNT1-CNT4 are configured to calculate the count values according to how many times the data in the registers REG1-REG3 are refreshed or overwritten. For example, the count value of the counter CNT1 is increased when the data in the register REG1 is refreshed and/or overwritten.

In some embodiments, the power state transformer 122 is configured to determine the power state PS of the GPU model 210 according to the count values of the performance activities calculated by the counters CNT1-CNT4. In some embodiments, the power state selector 122A is configured to select one power state PS from the candidate power states in the power state lookup table 162 according to the count values of the counters CNT1-CNT4 about the performance activities executed by the GPU model 210. For example, the active state is selected by the power state selector 122A from the candidate power states when the count values of the counters CNT1-CNT4 are greater than an upper limit value. For another example, the idle state is selected by the power state selector 122A from the candidate power states when the count values of the counters CNT1-CNT4 are less than a lower limit value.

As illustrated in FIG. 2, in some embodiments, the power state selector 122A is further coupled to the registers REG1-REG3 of the GPU model 210. In some embodiments, the power state selector 122A is further configured to check variations of the data stored in the registers REG1-REG3. If one of the data stored in the registers REG1-REG3 is changed and/or overwritten, the power state selector 122A will acknowledge the variation of the data.

In some embodiments, the power state selector 122A selects one power state PS from the candidate power states in the power state lookup table 162 according to a combination of the count values and the variations of the data stored in the registers REG1-REG3. For example, the active state will be selected by the power state selector 122A from the candidate power states when the count values of the counters CNT1-CNT4 are greater than an upper limit value and/or the data in the registers REG1-REG3 are varied over an upper limit frequency. For example, the idle state is selected by the power state selector 122A from the candidate power states when the count values of the counters CNT1-CNT4 are less than a lower limit value and/or the data in the registers REG1-REG3 are varied below a lower limit frequency.

In some embodiments, while the GPU model 210 performs the performance activities, the GPU model 210 conducts some memory access commands to a memory module (not shown). For example, the GPU model 210 sends a read command to the memory module to fetch 3D object data, textures or pixel data stored in the memory module, or alternatively, the GPU model 210 sends a write command to the memory module to record some image data or buffer data generated by the GPU model 210.

Figure 3:
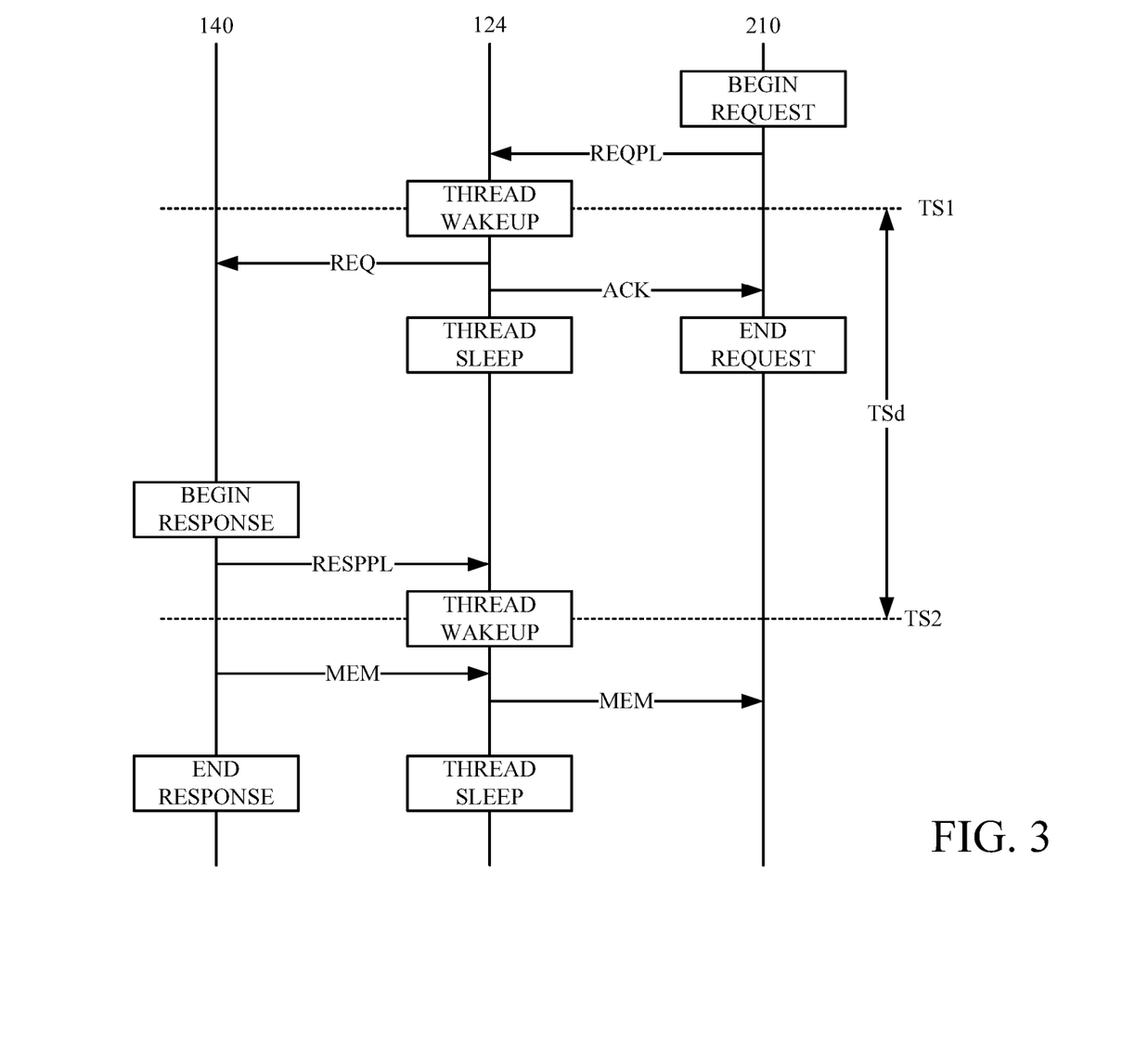
FIG. 3 is a schematic diagram illustrating a read procedure performed between the GPU model and the memory model through the transaction interface in FIG. 2 according to some embodiments of the present disclosure.

Reference is also made to FIG. 3, which is a schematic diagram illustrating a read procedure performed between the GPU model 210 and the memory model 140 through the transaction interface 124 in FIG. 2, according to some embodiments of the present disclosure. For ease of understanding, FIG. 3 is discussed below with reference to FIG. 2.

As illustrated in FIG. 2 and FIG. 3, when the GPU model 210 tends to read data from the memory model 140, a request phase of a reading operation begins. During the reading operation, the GPU model 210 sends a request payload REQPL to the transaction interface 124. A thread on the transaction interface 124 is awaked to queue the request payload REQPL. In some embodiments, the transaction interface 124 is configured to record a first timestamp TS1 when the thread is awaked. The transaction interface 124 transmits the request REQ to the memory model 140. Then, the transaction interface 124 returns an acknowledge message ACK to the GPU model 210, and the request phase ends.

In response to the reading request, the memory model 140 will begin a response phase. The memory model 140 returns a response payload RESPPL to the transaction interface 124. Another thread on the transaction interface 124 is awaked to queue the response payload RESPPL. In some embodiments, the transaction interface 124 is configured to record a second timestamp TS2 when this thread is awaked. In response to the request REQ, the memory model 140 is accessed through the transaction interface 124. The memory model 140 returns the memory data MEM to the transaction interface 124. The transaction interface 124 transmits the memory data MEM to the GPU model 210, and then the response phase of the reading operation ends.

In some embodiments, the transaction interface 124 is configured to record a time duration between the request phase of the access command and the response phase of the access command. As illustrated in FIG. 3, the transaction interface 124 records the time duration TSd between the first timestamp TS1 and the second timestamp TS2, and the transaction interface 124 provides the time duration TSd to the power state transformer 122. In other words, the time duration TSd is able to be expressed as TSd=(TS2−TS1). In such embodiments, the time duration TSd indicates a time period in which the GPU model 210 is enabled and waits for response messages of the access commands from the memory model 140. In other words, the time duration TSd provides an indication of how long the GPU model 210 is awaked. In various embodiments, the time duration TSd is a transition time of the access commands.

In some embodiments, the power state selector 122A of the power state transformer 122 in FIG. 2 is configured to select one power state PS from the candidate power states in the power state lookup table 162 according to the count values of the counters CNT1-CNT4 and the time duration TSd discussed above. For example, the host state will be selected by the power state selector 122A from the candidate power states when the count values of the counters CNT1-CNT4 are greater than an upper limit value, and/or when the time duration TSd of an access operation continues for a predetermined time interval.

In some embodiments, the power state selector 122A of the power state transformer 122 is configured to select one power state PS from the candidate power states in the power state lookup table 162 according to a combination of the count values of the counters CNT1-CNT4, the variations of the data stored in the registers REG1-REG3, and the time duration TSd. The count values of the counters CNT1-CNT4 indicate the amount of the performance activities within the GPU model 210. The power state transformer 122 provides the power state PS of the GPU model 210 to the host CPU 220, such that the host CPU 220 is able to analyze the estimated power consumption reading of the GPU model 210.

Figure 4:
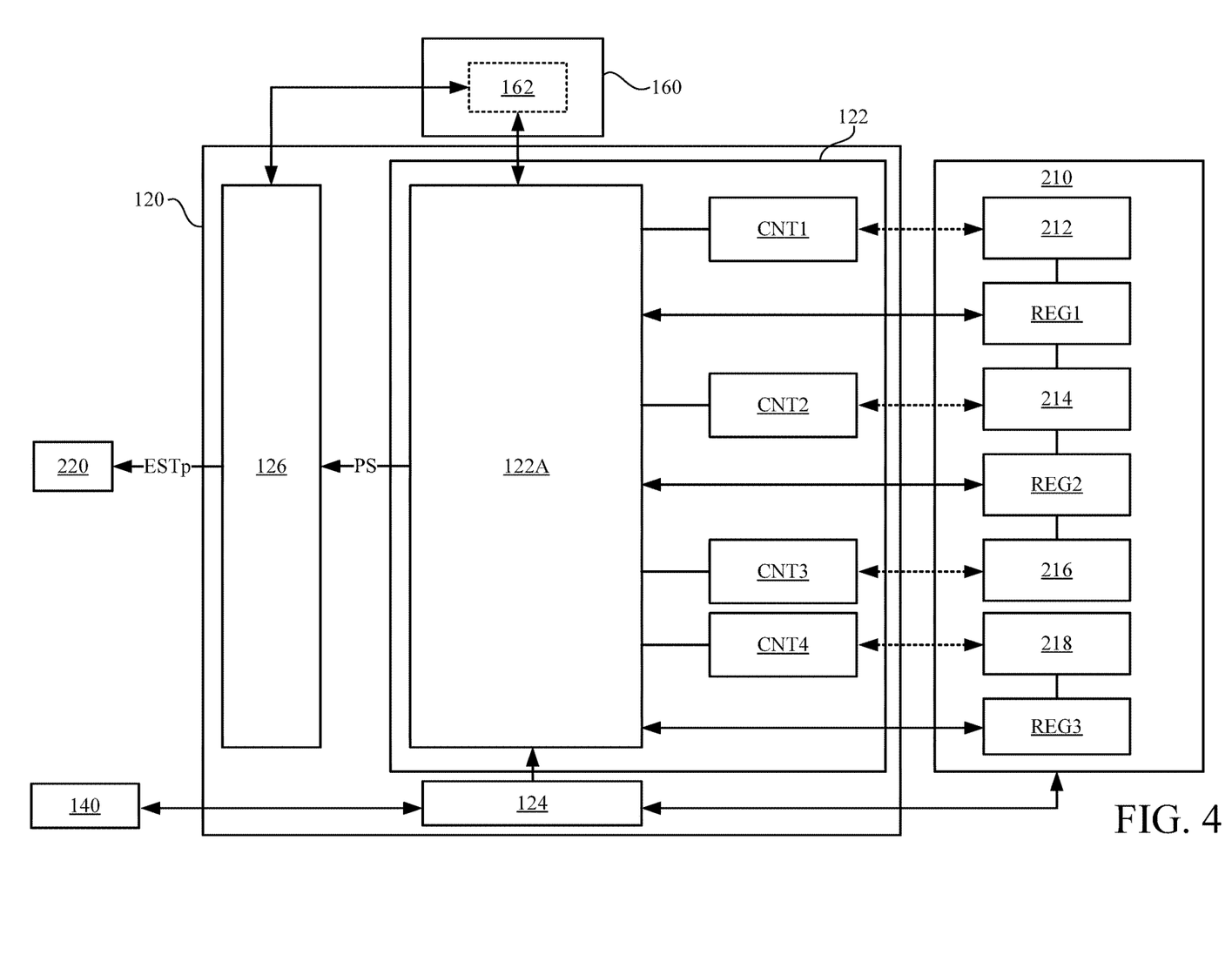
FIG. 4 is a schematic diagram illustrating further details of the power estimation adapter in FIG. 1 and the GPU model according to some other embodiments of the present disclosure.

Reference is also made to FIG. 4, which is a schematic diagram illustrating further details of the power estimation adapter 120 in FIG. 1 and the GPU model 210 according to some other embodiments of the present disclosure. With respect to the embodiments of FIG. 1 and FIG. 2, like elements in FIG. 4 are designated with the same reference numbers for ease of understanding.

Compared to embodiments illustrated in FIG. 1 and FIG. 2, the power estimation adapter 120 shown in FIG. 4 further includes a power analyzer 126. In some embodiments, the power analyzer 126 is configured to analyze the selected power state PS, and to generate an estimated power consumption reading ESTp of the GPU model 210 according to the selected power state PS. The power analyzer 126 provides the estimated power consumption reading ESTp of the GPU model 210 to the host CPU 220, to be further processed and/or monitored.

In some embodiments, information of the power consumption inside the GPU model 210 is associated with the selected power state PS and/or the estimated power consumption reading ESTp. Accordingly, based on the estimated power consumption reading ESTp, the host CPU 220 is able to monitor the information of the power consumption inside the GPU model 210.

Figure 5:
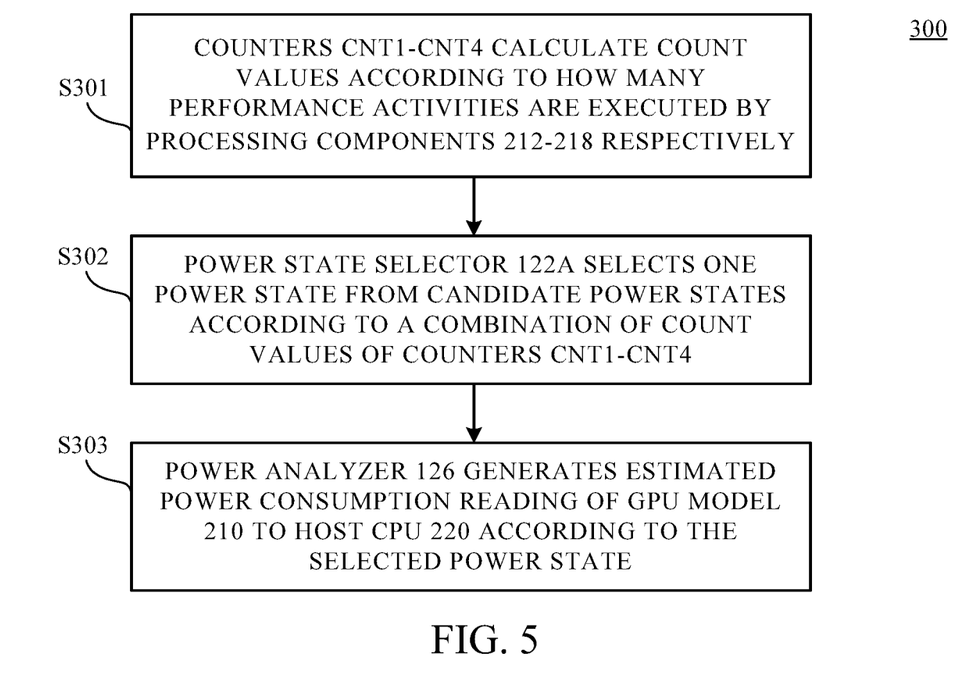
FIG. 5 is a flow diagram illustrating a method for estimating a power consumption of a processing unit model according to some embodiment of the present disclosure.

Reference is also made to FIG. 5, which is a flow diagram illustrating a method 300 for estimating a power consumption of the GPU model 210 in FIG. 4, according to some embodiments of the present disclosure. For ease of understanding, the method 300 is explained below with reference to the embodiments illustrated in FIG. 4. The method 300 is not limited to be applied in the embodiments illustrated in FIG. 4. Various embodiments employing the method 300 are within the contemplated scope of the present disclosure.

In operation S301, the counters CNT1-CNT4 calculate the count values according to the number of performance activities which are executed by the processing components 212, 214, 216 and 218 respectively in a testing period.

In operation S302, the power state selector 122A selects one power state PS from the candidate power states in the power state lookup table 162 according to a combination of the count values of the counters CNT1-CNT4 in FIG. 4. As mentioned above, in some other embodiments, the power state PS is selected according to the count values of the counters CNT1-CNT4 and the variations of the data stored in the registers REG1-REG3 in FIG. 4. As mentioned above, in some alternative embodiments, the power state PS is selected according to the count values of the counters CNT1-CNT4, the variations of the data stored in the registers REG1-REG3 and the time duration TSd as discussed in FIG. 3.

In operation S303, the power analyzer 126 generates and provides the estimated power consumption reading ESTp of the GPU model 210 to the host CPU 220 according to the selected power state PS. Accordingly, in some embodiments, the host CPU 220 is able to monitor the information of the power consumption inside the GPU model 210 without additional detection programs. With such arrangements, even if the GPU model 210 is substituted, e.g., updated to a new version or the vender of the GPU model 210 is changed to another provider, the arrangements of the host CPU 220 is still able to acknowledge the information of the power consumption of the GPU model 210 through the power state transformer 122 without further modifications.

Figure 6:
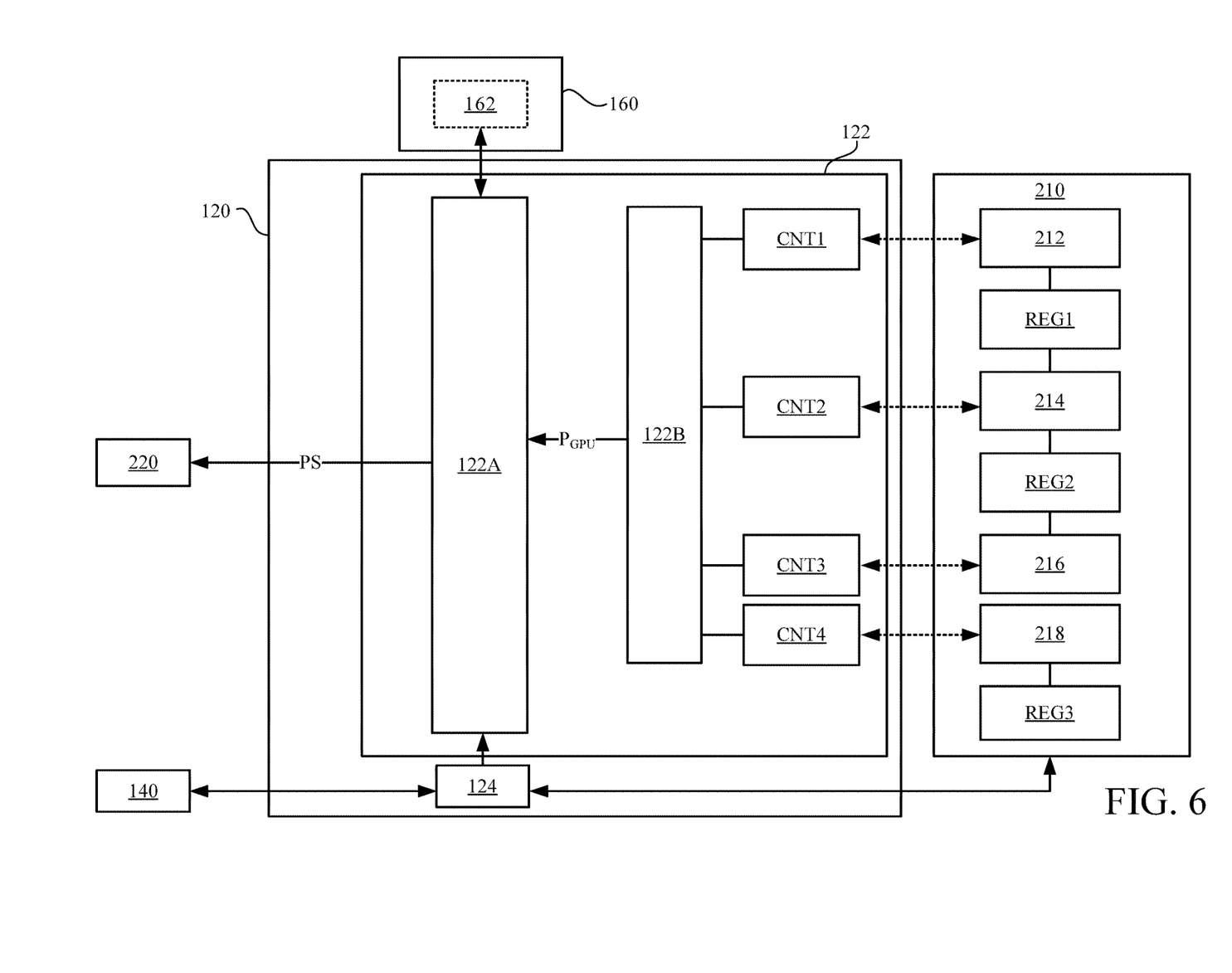
FIG. 6 is a schematic diagram illustrating further details of the power estimation adapter in FIG. 1 and the GPU model according to some embodiments of the present disclosure.

Reference is also made to FIG. 6, which is a schematic diagram illustrating further details of the power estimation adapter 120 in FIG. 1 and the GPU model 210 according to some embodiments of the present disclosure. With respect to the embodiments of FIG. 1 and FIG. 2, like elements in FIG. 6 are designated with the same reference numbers for ease of understanding.

Compared to embodiments illustrated in FIG. 2, the power estimation adapter 122 shown in FIG. 6 further includes a power mathematical modeler 122B in addition to the power state selector 122A. The power mathematical modeler 122B is coupled between the counters CNT1-CNT4 and the power state selector 122A. In some embodiments, the power mathematical modeler 122B is configured for calculating an estimation power $P_{GPU}$ according to the count values of the counters CNT1-CNT4 with a mathematical model. In some embodiments, the power state selector 122A is configured for selecting the power state PS of the GPU model 210 according to the estimation power $P_{GPU}$. The operations used to calculate the estimation power $P_{GPU}$ and to select the power state PS are further discussed below with reference to FIG. 7.

Figure 7:
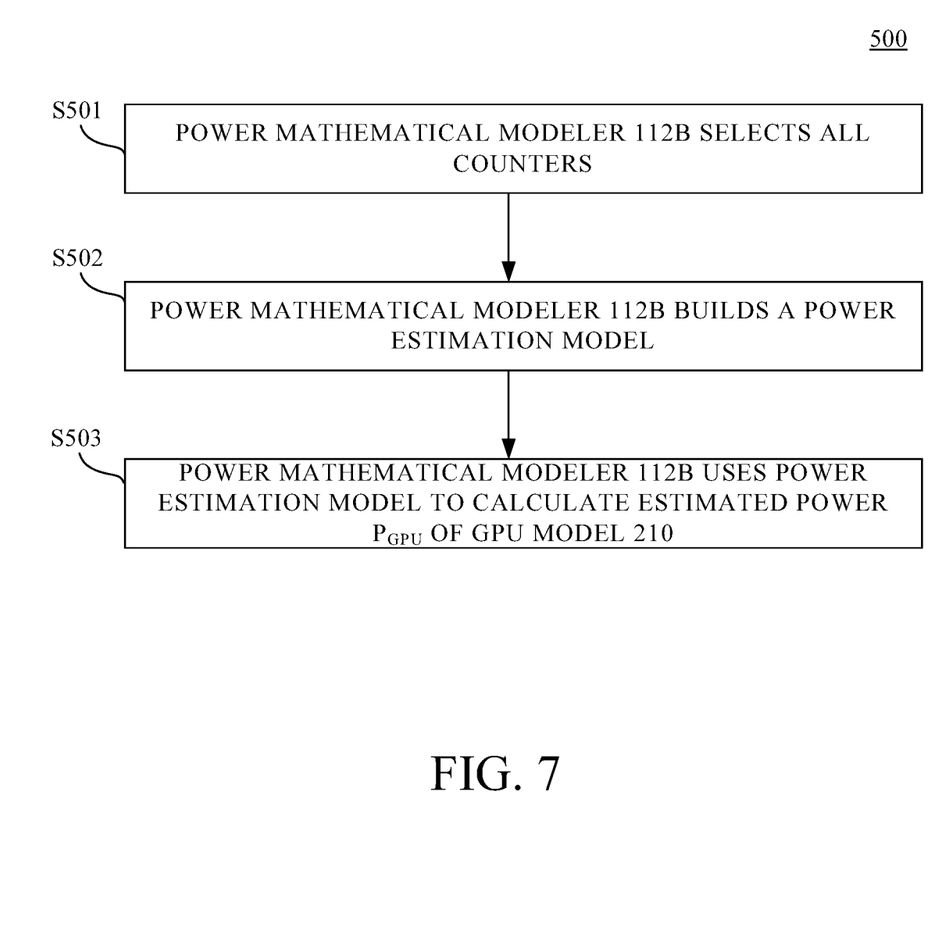
FIG. 7 is a flow diagram illustrating a method performed by the power mathematical modeler 122B in FIG. 6 according to some embodiments of the present disclosure.

FIG. 7 is a flow diagram illustrating a method 500 performed by the power mathematical modeler 122B in FIG. 6 according to some embodiments of the present disclosure. The method 500 includes, for example, operations S501-S503, which are discussed below with reference to the embodiments in FIG. 6.

In operation S501, the power mathematical modeler 122B selects all of the counters, for example the counters CNT1-CNT4 in FIG. 6. In operation S502, the power mathematical modeler 122B builds a power estimation model. In operation S503, the power mathematical modeler 122B uses the power estimation model to calculate an estimated power $P_{GPU}$ of the GPU model 210. Some embodiments and/or examples are given below for further illustrating the operations S501-S503.

For illustration, it is assumed that the GPU model 210 includes N processing components where N is a positive integer (e.g., N=4), and there are N counters for counting the performance activities executed by the N processing components. For illustration, all of the counters CNT1-CNT4 corresponding to the processing components 212, 214, 216 and 218 within the GPU model 210 in FIG. 6 are selected. Power consumptions by each individual processing component of the N processing components are estimated based on the power estimation model according to their local activity counters. Power consumptions of each of the processing components are measured by the power estimation model which, in some embodiments, indicates equation (1):

$$P_k = \sum_{j=1}^{n_k} C_{k,j} \cdot W_{k,j} + K_k \qquad (1)$$

$P_k$ is an estimated power consumption for the k-th processing component, $n_k$ is the number of the counters of the k-th processing component, $C_{k,j}$ is the count values, $W_{k,j}$ is a power consumption parameter. Multiple linear regressions are used to estimate the weights $W_{k,j}$ by utilizing training data including a set of counter values and the corresponding measured power for each one of the N processing components.

In some embodiments, power consumptions of the N processing components are aggregated to be the estimated power $P_{GPU}$ of the GPU model 210 by using the power estimation model with the equation (1). The estimated power $P_{GPU}$ is able to derived using equation (2):

$$P_{GPU} = \sum_{i=1}^{N} P_i, \text{ where } P_i \; \forall \, i \in [1, N] \qquad (2)$$

For example, the estimated power $P_{GPU}$ of the GPU model 210 is aggregated by $P_{GPU}=P_1+P_2+P_3+P_4$. $P_1$ is an estimated power consumption of the processing component 212. $P_2$ is an estimated power consumption of the processing component 214. $P_3$ is an estimated power consumption of the processing component 216. $P_4$ is an estimated power consumption of the processing component 218.

In some embodiments illustrated in FIG. 6, the estimation power $P_{GPU}$ is calculated by the power mathematical modeler 122B and provided to the power state selector 122A.

According to the estimation power $P_{GPU}$, the power state selector 122A is configured to select one power state PS from the candidate power states stored in the power state lookup table 162. In some embodiments, one of the candidate power states is selected by the power state selector 122A as the power state PS. The selected one of the candidate power states indicates the closest power consumption to the estimated power $P_{GPU}$. With such arrangements, the power state transformer 122 provides the power state PS of the GPU model 210 to the host CPU 220. Accordingly, the host CPU 220 is able to analyze an estimated power consumption reading according to the power state PS of the GPU model 210. Effectively, with such arrangements, the host CPU 220 is able to monitor the data inside the GPU model 210 without an additional detection program.

In some embodiments, components of the device 200 and/or the GPU model 210 are implemented by software codes executed by a processor (not shown) in a computer system (not shown). For illustration, the power estimation adapter 120, the memory model 140, the storage unit 160, the bus interface 180, the processing components 212, 214, 216 and 218 and/or the registers REG1-REG3 are implemented by software codes. In some embodiments, the GPU model 210 is a software-based model utilized to simulate and operate as a physical hardware of GPU integrated circuits, and the device 200 is a software-based platform utilized to provide an interconnecting interface between the GPU model 210 and the host CPU 220. The software-based device 200 and the GPU model 210 are suitable to verify the power consumption of the GPU model 210 at Electronic System Level (ESL) stage. If the power consumption of the GPU model 210 fails to match a power consumption requirement, the GPU model 210 is able to be re-designed at the Electronic System Level (ESL) stage. Accordingly, when the GPU model 210 is adjusted to match the power consumption requirement, a physical hardware-based GPU circuit is able to be fabricated or adjusted based on the adjusted GPU model 210. Effectively, in some embodiments, before fabricating the physical hardware-based GPU circuit, the functions and the performance of the physical hardware-based GPU circuit are able to be tested and verified through the arrangements of the GPU model 210.

In some other embodiments, components of the device 200 and the GPU model 210 are implemented by programmable circuits including, for example, Field-programmable gate array (FPGA). When some processing tasks are assigned to the GPU model 210, the host CPU 220 is able to acknowledge a power state and/or an estimated power consumption reading of the GPU model 210 through the device 200 implemented in the FPGA.

In some embodiments, a device is disclosed to include a power state transformer. The power state transformer is configured to count performance activities executed in the processing unit model. The power state transformer is configured to determine a power state of the processing unit model according to count values of the performance activities.

In some embodiments, a system is also disclosed to include a processing unit model and a power estimation adaptor. The processing unit model is configured to execute processing tasks from a host processing unit. The power estimation adaptor is coupled between the host processing unit and the processing unit model. The power estimation adaptor is configured to determine generate a power state of the processing unit model. The power estimation adaptor includes a power state transformer. The power state transformer is configured to count performance activities executed in the processing unit model and determine the power state of the processing unit model according to count values of the performance activities. The power state transformer is configured to transmit the power state to the host processing unit.

A method is also disclosed that includes the operations below. Performance activities executed in a processing unit model. A power state of the processing unit model is determined according to count values of the performance activities. An estimated power consumption reading of the processing unit model is generated according to the power state.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A device, comprising:
a transformer circuit coupled with a processing circuit, being configured to count performance activities executed in the processing circuit, and the transformer circuit is further configured to compare count values of the performance activities with a predetermined value to determine a power state of the processing circuit,
wherein the transformer circuit is configured to transmit the power state of the processing circuit to a host processing circuit for analyzing an estimated power consumption reading of the processing circuit; and
a transaction interface circuit coupled between the processing circuit and a memory, and configured to receive a request from the processing circuit and record a first timestamp, and further configured to receive a response from the memory and record a second timestamp, the transaction interface circuit being further configured to record a time difference between the first timestamp and the second timestamp as a time difference,
wherein the transformer circuit is further configured to determine the power state of the processing circuit based on both of the count values and the time difference,
wherein the transaction interface circuit is further configured to be awoke, in response to the request from the processing circuit, to transmit the request to the memory, and the transaction interface circuit is further configured to be awoke, in response to the response from the memory, to transmit the response to the processing circuit.

2. The device of claim 1, wherein the transaction interface circuit is further configured to return an acknowledge message to the processing circuit after the transaction interface circuit transmits the request to the memory.

3. The device of claim 1, wherein the transaction interface circuit is further configured to transmit access commands between the memory and the processing circuit.

4. The device of claim 1, wherein the transaction interface circuit is coupled to the transformer circuit.

5. The device of claim 1, wherein the processing circuit comprises:
a plurality of processing components configured to execute the performance activities; and
a plurality of registers configured to store data to be inputted to the plurality of processing components,
wherein the transformer circuit is further configured to determine the power state of the processing circuit according to the count values and variations of the data stored in the plurality of registers.

6. The device of claim 5, wherein the transformer circuit is configured to determine the power state of the processing circuit according to the count values, the variations of the data stored in the registers, the time difference, or a combination thereof.

7. The device of claim 1, further comprising:
a storage unit configured to store a power state lookup table, wherein the power state lookup table comprises a plurality of candidate power states corresponding to the processing circuit,
wherein the transformer circuit comprises a selector circuit configured to select the power state of the processing circuit from the candidate power states.

8. The device of claim 7, further comprising:
an analyzer circuit configured to analyze the selected power state, and to generate the estimated power consumption reading of the processing circuit to the host processing circuit according to the selected power state.

9. The device of claim 1, further comprising:
a storage unit configured to store a power state lookup table, wherein the power state lookup table comprises a plurality of candidate power states corresponding to the processing circuit,
wherein the transformer circuit comprises a power mathematical modeler and a selector circuit, the power mathematical modeler is configured to calculate an estimation power according to the count values, and the selector circuit is configured to select the power state of the processing circuit according to the estimation power.

10. A system, comprising:
a selector circuit configured to check variation of data, induced by performance activities;
a transaction interface circuit configured to record a time duration of the performance activities; and
a processing circuit comprising a plurality of processing components configured to execute the performance activities,
wherein the transaction interface circuit couples a memory to the plurality of processing components, the transaction interface circuit is further configured to be awoke, in response to a request from the processing circuit, to transmit the request to the memory, and the transaction interface circuit is further configured to be awoke, in response to a response from the memory, to transmit the response to the processing circuit,
wherein the selector circuit is further configured to select a power state according to count values corresponding to the performance activities, the variation of data, the time duration, or a combination thereof, and is configured to transmit the power state to a host processing circuit for analyzing an estimated power consumption reading of the performance activities.

11. The system of claim 10, further comprising:
a plurality of counters, each of the plurality of counters being configured to calculate a count value for one of the processing components; and
a plurality of registers configured to store and/or buffer data of the plurality of processing components.

12. The system of claim 10, further comprising:
an analyzer circuit configured to analyze the selected power state and configured to output, according to the selected power state, the estimated power consumption reading,
wherein the estimated power consumption reading is configured to be processed or monitored by the host processing circuit.

13. The system of claim 10, further comprising:
a storage unit configured to store a power state lookup table, wherein the power state lookup table comprises a plurality of candidate power states corresponding to the performance activities; and
a power mathematical modeler coupled between the selector circuit and a plurality of counters, the power mathematical modeler being configured to calculate an estimation power according to the count values,
wherein the selector circuit is configured to select the power state according to the estimation power.

14. A method, comprising:
counting performance activities executed in a processing circuit and generating count values corresponding to the performance activities;
calculating a time duration, in which the processing circuit is configured to be enabled to send requests and/or receive responses via a transaction interface circuit, wherein the transaction interface circuit is coupled between the processing circuit and a memory, the transaction interface circuit is configured to be awoke, in response to a request from the processing circuit, to transmit the request to the memory, and the transaction interface circuit is further configured to be awoke, in response to a response from the memory, to transmit the response to the processing circuit;
selecting, by a transformer circuit, a power state of the processing circuit according to the count values and the time duration; and
evaluating, by a host processing circuit, a power consumption of the processing circuit according to the power state selected by the transformer circuit.

15. The method of claim 14, further comprising:
determining, by the transformer circuit, the power state of the processing circuit according to the count values and variations of data stored in a plurality of registers of the processing circuit.

16. The method of claim 14, wherein calculating the time duration comprises:
recording a first timestamp when the transaction interface circuit receives a request from the processing circuit; and
recording a second timestamp when the transaction interface circuit receives a response from the memory,
wherein the time duration is a time difference between the first timestamp and the second timestamp.

17. The method of claim 14, wherein the transformer circuit comprises a selector circuit configured to select the power state from a power state lookup table stored in a storage unit comprising a plurality of candidate power states corresponding to the processing circuit.

18. The method of claim 17, further comprising:
calculating, by a power mathematical modeler, an estimation power according to the count values, wherein the selector circuit is configured to select the power state according to the estimation power.

19. The method of claim 17, further comprising:
analyzing the selected power state, and generating an estimated power consumption reading of the processing circuit to the host processing circuit according to the selected power state.

20. The system of claim 10, wherein the transaction interface circuit is further configured to return an acknowledge message to the processing circuit after the transaction interface circuit transmits the request to the memory.

* * * * *